(12) United States Patent
Park et al.

(10) Patent No.: US 9,106,393 B2
(45) Date of Patent: *Aug. 11, 2015

(54) METHOD AND DEVICE FOR POSITION UPDATE FOR M2M WIRELESS COMMUNICATION

(75) Inventors: Gi Won Park, Anyang-si (KR); Young Soo Yuk, Anyang-si (KR); Jeong Ki Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/232,686

(22) PCT Filed: Jul. 26, 2012

(86) PCT No.: PCT/KR2012/005984
§ 371 (c)(1),
(2), (4) Date: Jan. 14, 2014

(87) PCT Pub. No.: WO2013/015640
PCT Pub. Date: Jan. 31, 2013

(65) Prior Publication Data
US 2014/0206405 A1  Jul. 24, 2014

Related U.S. Application Data (60) Provisional application No. 61/511,558, filed on Jul. 26, 2011.

(51) Int. Cl.
*H04L 5/00* (2006.01)
*H04W 4/00* (2009.01)
(Continued)

(52) U.S. Cl.
CPC ............ *H04L 5/0069* (2013.01); *H04W 4/005* (2013.01); *H04W 60/04* (2013.01); *H04W 72/048* (2013.01); *H04W 4/02* (2013.01); *H04W 76/046* (2013.01)

(58) Field of Classification Search
None
See application file for complete search history.

(56) References Cited

U.S. PATENT DOCUMENTS

2009/0227265 A1 *  9/2009  Kang et al. ............... 455/456.1
2010/0041399 A1 *  2/2010  Kim et al. ................. 455/434
(Continued)

FOREIGN PATENT DOCUMENTS

| KR | 1020090100478 A | 9/2009 |
|---|---|---|
| WO | 2010077002 A2 | 7/2010 |
| WO | 2011068366 A2 | 6/2011 |

OTHER PUBLICATIONS

Honggang Li et al., "Optimized schemes for network re-entry for M2M in 16m", IEEE 802.16 Broadband Wireless Access Working Group, May 8, 2011.*

(Continued)

*Primary Examiner* — Alex Skripnikov
*Assistant Examiner* — Nicole E King
(74) *Attorney, Agent, or Firm* — Dentons US LLP (57) ABSTRACT

Provided are a method and device for performing a position update in machine to machine (M2M) communication. An M2M apparatus in an idle mode receives a paging message from a base station. The paging message comprises an action code and a network access type, the action code being an indication for the M2M apparatus to implement position update. When the network access type indicates the allocation of resources for a ranging request, the M2M apparatus transmits the ranging request to the base station by means of an allocated uplink.

10 Claims, 5 Drawing Sheets

(51) Int. Cl.
*H04W 60/04* (2009.01)
*H04W 72/04* (2009.01)
*H04W 76/04* (2009.01)
*H04W 4/02* (2009.01)

(56) References Cited

U.S. PATENT DOCUMENTS

2010/0067467 A1* 3/2010 Cho et al. ............... 370/329
2010/0113070 A1* 5/2010 Nigam et al. ............ 455/458
2011/0075604 A1* 3/2011 Fong et al. .............. 370/328
2012/0327882 A1* 12/2012 Park et al. ............... 370/329

OTHER PUBLICATIONS

IEEE 802.16 Broadband Wireless Access Working Group <http://ieee802.org/16>, "Idle mode optimizations for fixed M2M devices", Jul. 20, 2011, Honggang Li, et al.
IEEE 802.16 Broadband Wireless Access Working Group <http://ieee802.org/16>, "Ranging resource allocation for idle mode fixed M2M device in WirelessMAN IMT-Advanced system", Sep. 21, 2011, Gi Won Park, et al.

* cited by examiner

FIG. 5

METHOD AND DEVICE FOR POSITION UPDATE FOR M2M WIRELESS COMMUNICATION

This application is a 35 USC §371 National Stage entry of International Application No. PCT/KR2012/005984, filed on Jul. 26, 2012, and claims priority of U.S. Provisional Application No. 61/511,558, filed Jul. 26, 2011, which are each hereby incorporated by reference in its entirety.

BACKGROUND OF THE INVENTION

1. Field of the Invention

The present invention relates to wireless communication, and more particularly, to a method and apparatus for performing a position update for machine to machine (M2M) communication in a wireless communication system.

2. Related Art

Machine to machine (M2M) communication (also called machine type communication (MTC)) is one type of data communication including one or more entities not requiring human interactions. That is, the M2M communication refers to the concept of communication based on the existing wireless communication network used by a machine device instead of a user equipment used by a user. The machine device used in the M2M communication can be called a M2M device. There are various M2M devices such as a vending machine, a machine of measuring a water level at a dam, etc.

The M2M device has a feature different from that of a typical user equipment. Therefore, a service optimized to the M2M communication may differ from a service optimized to human-to-human communication. In comparison with a current mobile network communication service, the M2M communication can be characterized as a different market scenario, data communication, less costs and efforts, a potentially great number of M2M devices, wide service areas, low traffic for each M2M device, etc.

A typical location update is used to recognize a location of a user equipment in a paging group. However, the M2M device may have a mobility significantly less than or greater than that of the user equipment.

There is a need for a location update method considering a feature of M2M communication.

SUMMARY OF THE INVENTION

The present invention provides a method and apparatus for performing a location update for machine to machine (M2M) communication.

In an aspect, a method for performing a location update in machine-to-machine (M2M) communication is provided. The method includes entering, by a M2M device, into an idle mode, receiving, by the M2M device in the idle mode, a paging message from a base station, the paging message including an action code and a network access type, the action code indicating that the M2M device performs a location update, and when the network access type indicates a resource allocation for a ranging request, transmitting, by the M2M device, the ranging request to the base station on an allocated uplink resource.

The paging message may further include a resource offset to indicate an offset that a UL-MAP including the allocated uplink resource is transmitted.

In an aspect, a device configured for performing a location update in machine-to-machine (M2M) communication is provided. The device includes a radio frequency unit for receiving and transmitting a radio signal, and a processor operatively coupled with the radio frequency unit and configured to enter into an idle mode, receive a paging message from a base station, the paging message including an action code and a network access type, the action code indicating that the device performs a location update, and when the network access type indicates a resource allocation for a ranging request, instruct the radio frequency unit to transmit the ranging request to the base station on an allocated uplink resource.

A location update is proposed by considering a traffic feature and a mobility specific to machine to machine (M2M) communication. A signaling overhead caused by the location update can be decreased, and power of a M2M device can be saved.

DESCRIPTION OF EXEMPLARY EMBODIMENTS

Figure 1:
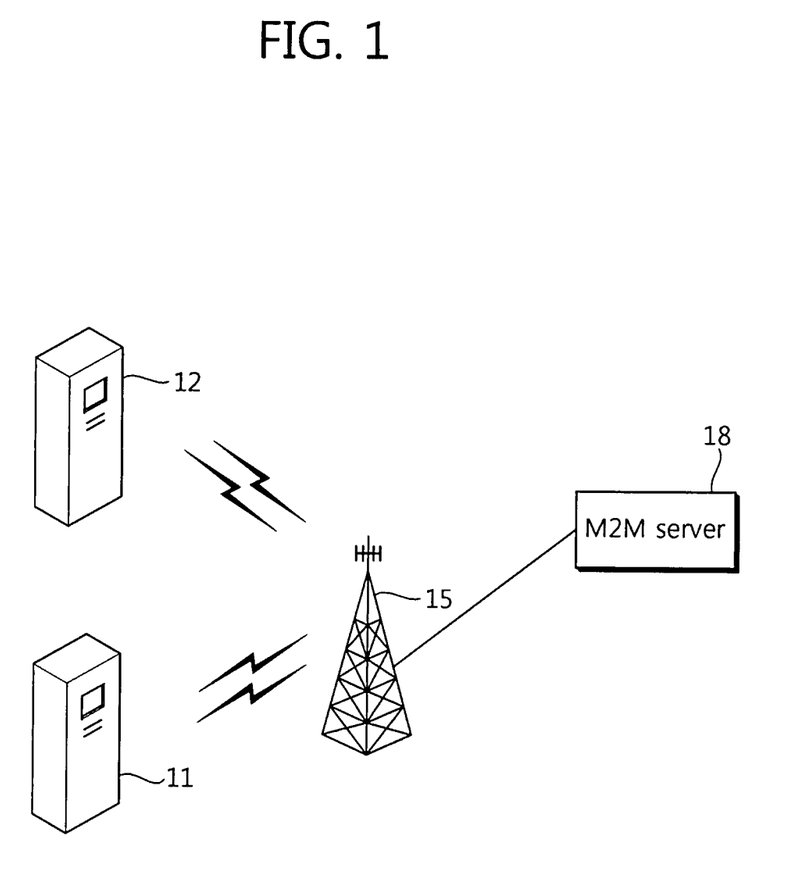
FIG. 1 shows an example of machine to machine (M2M) communication.

FIG. 1 shows an example of machine to machine (M2M) communication.

The M2M communication is also called a machine type communication (MTC), and refers to information exchange between M2M devices 11 and 12 via a base station (BS) 15 without human interactions and information exchange between the M2M device 11 and a M2M server 18 via the BS.

The M2M server 18 is an entity for communicating with the M2M device 11. The M2M server executes a M2M application, and provides a M2M-specific service to the M2M device 11.

The M2M device 11 is a wireless device for providing the M2M communication, and may be fixed or mobile. The M2M device is also called a MTC device.

A service provided using the M2M communication is differentiated from the existing communication service requiring human intervention, and its service range is various, such as tracking, metering, payment, medical field services, remote controlling, etc.

Representative examples of individual service requirements of M2M features are as follows.

1) Time controlled feature: This is a case in which the M2M device transmits or receives data only in a pre-defined specific duration. Therefore, unnecessary signaling performed outside the pre-defined specific duration can be avoided.

2) Time tolerant feature: This is a case in which the M2M device can delay data delivery. If a network load is greater than a pre-determined load threshold, a network operator can restrict network access of the M2M device or data transmission to another MTC device, and can dynamically restrict an amount of data that can be delivered by the MTC device in a specific region.

3) Offline indication feature: This is a case in which a notification is requested to the M2M device at a proper time when signaling is no longer possible between the M2M device and the network.

4) Priority alarm message (PAM) feature: This is a case in which, at the occurrence of a theft, a vandalism, or an emergency situation requiring an immediate attention, the M2M device preferentially reports this to the network.

It is considered that hundreds to thousands of M2M devices are deployed in one cell (or BS). Accordingly, it is difficult to identify the M2M devices by using only the existing user equipment identifiers, and thus the following identifier is taken into account.

Station identifier (STID): The STID is used to identify the M2M devices in a domain of the BS. The BS can assign the same STID to multiple M2M devices.

M2M group identifier (MGID): It is used to uniquely identify a M2M device group in a domain of a network entity which allocates the MGID.

Now, the idle mode operation in an IEEE 802.16e system will be described with reference to institute of electrical and electronics engineers (IEEE) 802.16-2009 "Part 16: Air Interface for Broadband Wireless Access Systems" (hereinafter, 802.16e) released at May 29, 2009. However, a wireless communication system to which the present invention is applied is not limited to the IEEE 802.16e-based system. Thus, the present invention is also applicable to various wireless communication systems such as 3rd generation partnership project (3GPP) long term evolution (LTE).

An idle mode is a mechanism by which a MS can periodically determine whether a downlink (DL) broadcast traffic message is available.

In the idle mode, the MS transitions between a paging listening interval and a paging unavailable interval. During the paging unavailable interval, the MS may perform actions (e.g., cell reselection, ranging, etc.) which do not guarantee DL traffic for a BS. In the paging listening interval, the MS monitors the DL traffic.

In order for the MS to enter the idle mode, the MS sends to the BS a deregistration-request (DREG-REG) message for requesting to enter the idle mode. The MS may enter the idle mode by receiving from the BS a deregistration-response (DREG-RSP) message for instructing to start the idle mode.

Alternatively, the BS may transmit a deregistration-command (DREG-CMD) message, so that the MS enters the idle mode.

Figure 2:
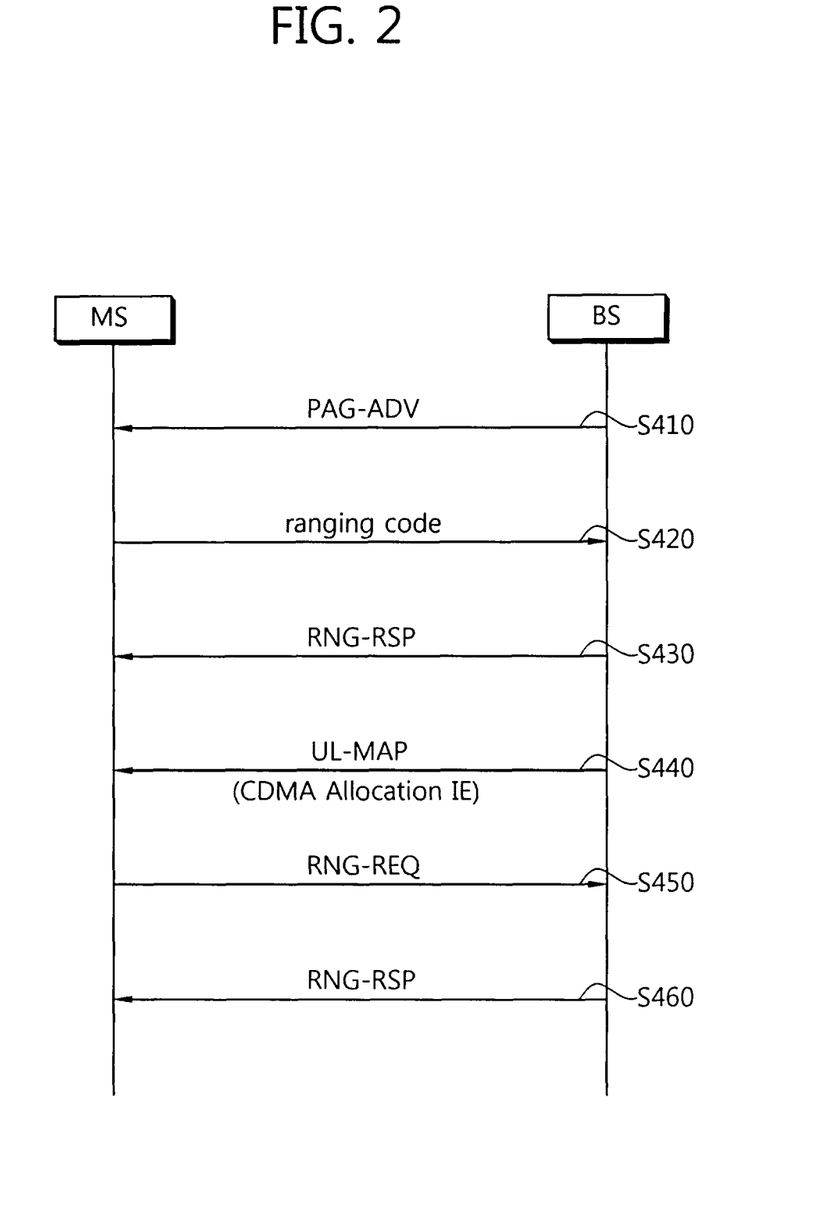
FIG. 2 is a flowchart showing an operation in an idle mode in institute of electrical and electronics engineers (IEEE) 802.16e.

FIG. 2 is a flowchart showing an operation in an idle mode in IEEE 802.16e.

In step S410, in the idle mode, a MS monitors reception of a paging message during a paging available interval, and thus receives a paging advertisement (PAG-ADV) message. The paging message is a notification message for indicating whether there is pending DL traffic to a specific MS.

By using the PAG-ADV message, a BS may instruct each MS to perform ranging for a network reentry or a location update.

In step S420, when the PAG-ADV message requests the network reentry, the MS ends the idle mode, and transmits a randomly selected ranging code to the BS.

In step S430, in response to the ranging code, the MS receives a ranging-response (RNG-RSP) message from the BS. The MS regulates UL timing and power on the basis of the RNG-RSP message. The RNG-RSP message includes a status code. The status code indicates one of 'continue', 'success', and 'abort'.

If the received RNG-RSP message has the status code of 'continue', the MS retransmits the ranging code.

If the status code is 'success', in step S440, the MS receives UL-MAP. The UL-MAP includes a CDMA allocation information element (IE).

In step S450, by using a UL resource assignment indicated by the CDMA allocation IE, the MS transmits a ranging-request (RNG-REQ) message to the BS.

In step S460, the MS receives a RNG-RSP message in response to the RNG-REQ message.

In the idle mode, the MS first transmits the ranging code for the network re-entry. The ranging code is randomly selected by the MS from a plurality of code sets, and this is called contention based ranging.

In general, a location update may be performed in an idle mode on a paging group basis. The MS may belong to one or more paging groups. A paging controller (PC) of each paging group performs paging if there is a call or data transmitted from an external network to the MS. The PC delivers a paging message to all BSs in the paging group, and each BS broadcasts the paging message for the location update to the MS.

Upon receiving the paging message for the location update, the M2M device may perform the aforementioned contention-based ranging. However, in the contention-based ranging, a time required for the ranging process may be significantly delayed, and power consumption of the M2M device may be increased.

Figure 3:
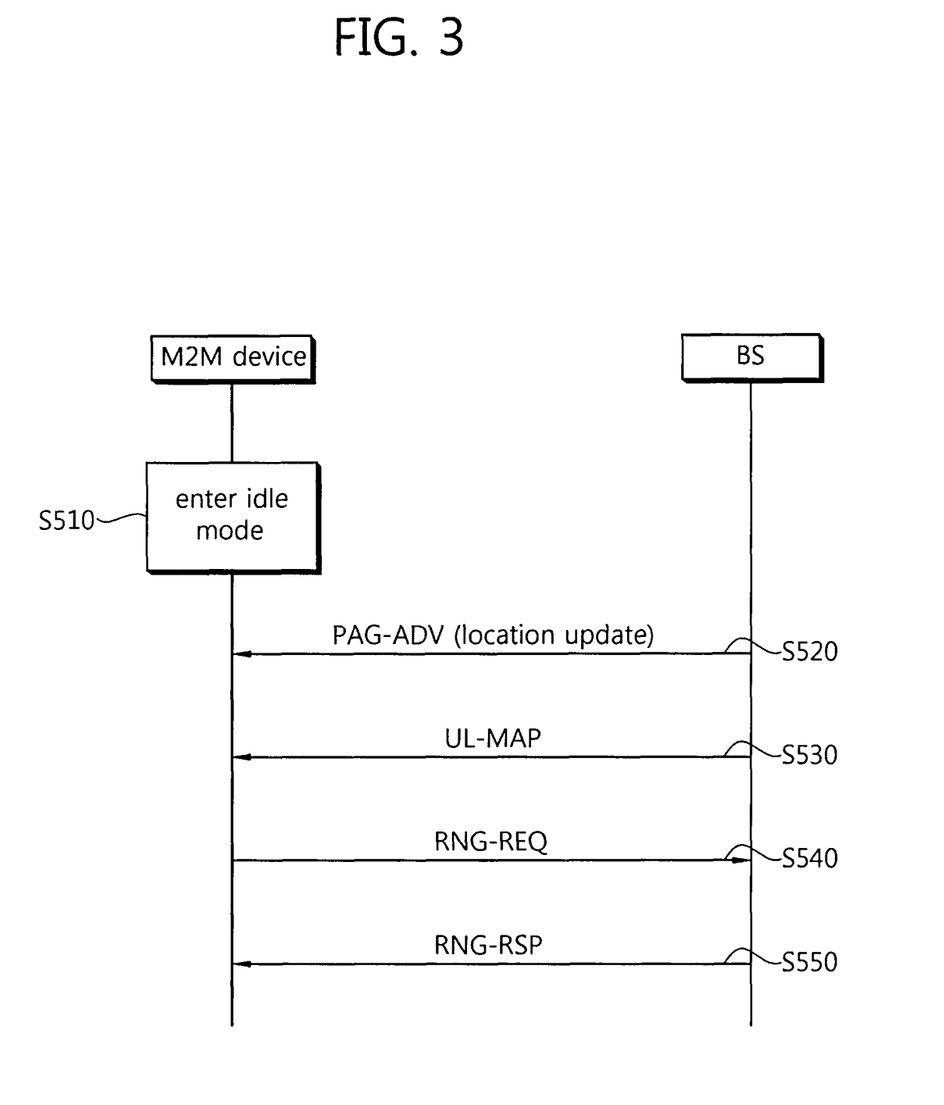
FIG. 3 shows a location update according to an embodiment of the present invention.

FIG. 3 shows a location update according to an embodiment of the present invention.

In step S510, a M2M device enters an idle mode. The idle mode entry may be performed at a request of the M2M device or at a command from a BS.

Before entering the idle mode, the M2M device may receive information regarding an idle mode timer from the BS. The idle mode timer indicates a maximum interval between two consecutive location updates when the M2M device is in the idle mode. When the location update is performed, the idle mode timer restarts.

In step S520, in the idle mode, the M2M device monitors reception of a paging message during a paging available interval and thus receives a PAG-ADV message. The PAG-ADV message may instruct to perform the location update to the M2M device.

Table 1 below shows an example of fields included in the PAG-ADV message.

TABLE 1

| Field name | Size (Byte) | Description |
| --- | --- | --- |
| Action code | 1 | Indicate purpose of PAG-ADV message. 0b01: perform location update |
| Network access type | | Indicate network access type. 0b00: resource allocation for RNG-REQ 0b01: allocation of dedicated ranging channel |
| M2M ID | | M2M device's identifier (e.g., MAC (medium access control) address) |
| Resource offset | | Exist when the network access type is 0b00. Indicate offset for transmitting UL-MAP including resource allocated for RNG-REQ. |
| Ranging resource | | Exist when the network access type is 0b01. Indicate allocated ranging code and ranging slot. |

Upon receiving the PAG-ADV message, the M2M device ends the idle mode and starts a network reentry process. Hereinafter, an example of setting a network access type to '0b00' is described.

In step S530, the M2M device may receive UL-MAP on the basis of the resource offset.

Table 2 below shows an example of fields included in the UL-MAP.

TABLE 2

| Field name | Size | Description |
|---|---|---|
| M2M ID | | M2M device's identifier. STID or MAC address |
| Duration | | Duration of allocation |
| Repetition coding indication | | Indicate repetition code of allocated burst |

In step S540, the M2M device transmits RNG-REQ to the BS by using a resource allocation in the UL-MAP. A ranging purpose indicator in the RNG-REQ may indicate that the M2M device starts the location update.

In step S550, the M2M device receives RNG-RSP in response to the RNG-REQ.

Figure 4:
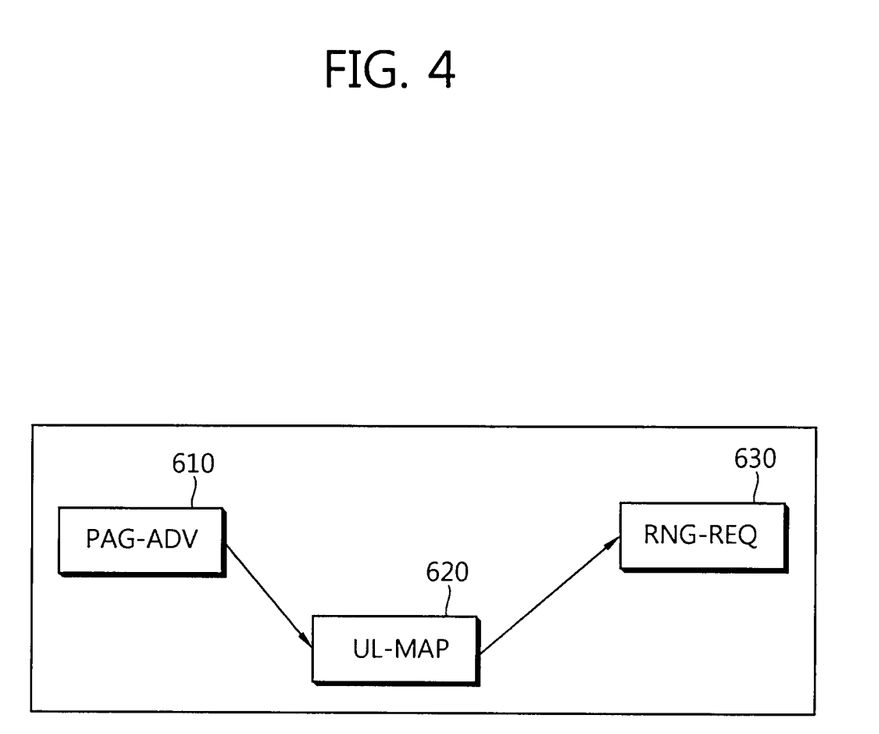
FIG. 4 shows an example of resource allocation of ranging-request (RNG-REQ) using a paging message.

FIG. 4 shows an example of resource allocation of RNG-REQ using a paging message.

A M2M device receives a PAG-ADV message 610 indicating resource allocation of the RNG-REQ. The M2M device receives UL-MAP 620 on the basis of a resource offset in the PAG-ADV message 610. The M2M device may determine whether the received UL-MAP is its UL-MAP on the basis of a M2M ID included in the UL-MAP 620.

The M2M device transmits an RNG-REQ 630 by using UL resource allocation included in the UL-MAP 620.

Under the assumption that the M2M device periodically performs UL transmission to the BS, a location update without ranging is proposed. However, UL synchronization may not be maintained due to a change in a channel situation.

If the BS no longer maintains the UL synchronization and thus the location update is necessary to perform the ranging, a network access type of the paging message may be set to '0b01, and a dedicated ranging resource may be allocated. The M2M device transmits the allocated ranging code to the BS to start the ranging process. By using the dedicated ranging code and the dedicated ranging slot, a collision of the ranging code is avoided, and the location update can be performed rapidly.

In the above table, a field name, a size, and a field value are for exemplary purposes only, and thus can be easily modified to other names and other values by those ordinarily skilled in the art. Not all of the fields proposed in the table are essential, and thus a specific field can be omitted.

Figure 5:
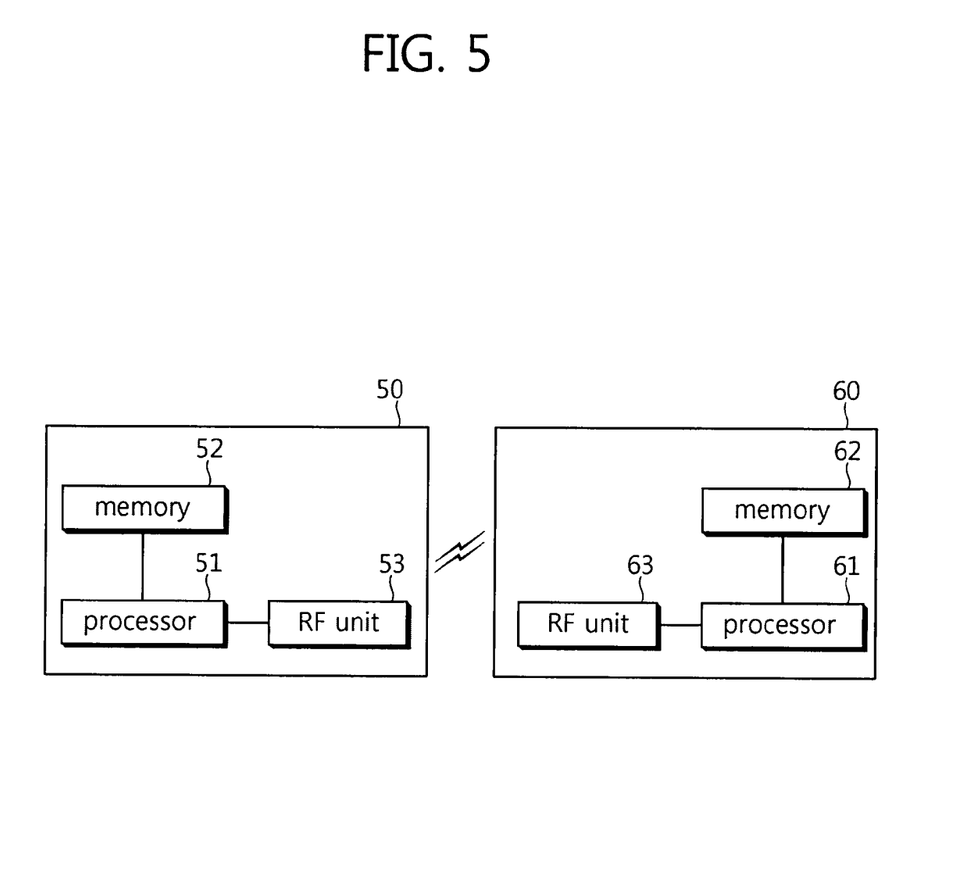
FIG. 5 is a block diagram showing a wireless communication system according to an embodiment of the present invention.

FIG. 5 is a block diagram showing a wireless communication system according to an embodiment of the present invention.

A MTC device 50 includes a processor 51, a memory 52, and a radio frequency (RF) unit 53. The memory 52 is connected to the processor 51 and configured to store various information used for the operations for the processor 51. The RF unit 53 is connected to the processor 51 and configured to transmit and/or receive a radio signal. The processor 51 implements the proposed functions, processed, and/or methods. In the described embodiments, the operation of the MTC device may be implemented by the processor 51.

A BS 60 includes a processor 61, a memory 62, and an RF unit 63. The memory 62 is connected to the processor 61 and configured to store various information used for the operations for the processor 61. The RF unit 63 is connected to the processor 61 and configured to transmit and/or receive a radio signal. The processor 61 implements the proposed functions, processed, and/or methods. In the described embodiments, the operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing a location update in machine-to-machine (M2M) communication, the method comprising:
    entering, by a M2M device, into an idle mode;
    receiving, by the M2M device in the idle mode, a paging message from a base station, the paging message including an action code, a resource offset, and a network access type; and
    transmitting, by the M2M device, a ranging request to the base station on an allocated uplink resource,
    wherein the ranging request is transmitted when the action code indicates a location update and the network access type indicates a resource allocation for the ranging request, and
    wherein the resource offset indicates that an uplink-map (UL-MAP) was transmitted, the UL-MAP including the allocated uplink resource.

2. The method of claim 1, wherein the ranging request includes a ranging purpose indicator indicating that the M2M device is initiating the location update.

3. The method of claim 1, further comprising:
    when the network access type indicates a dedicated ranging channel allocation, transmitting, by the M2M device, an assigned ranging code to the base station,
    wherein the paging message further includes information on the assigned ranging code.

4. The method of claim 1, wherein the paging message further includes an identifier that identifies the M2M device.

5. The method of claim 4, wherein the identifier includes a Medium Access Control (MAC) address of the M2M device.

6. A device configured for performing a location update in machine-to-machine (M2M) communication, the device comprising:
    a radio frequency unit for receiving and transmitting a radio signal; and
    a processor operatively coupled with the radio frequency unit and configured to:
    enter into an idle mode;
    receive a paging message from a base station, the paging message including an action code, a resource offset, and a network access type; and instruct the radio frequency unit to transmit the ranging request to the base station on an allocated uplink resource, wherein the ranging request is transmitted when the action code indicates a location update and the network access type indicates a resource allocation for the ranging request, and wherein the resource offset indicates that an uplink-map (UL-MAP) was transmitted, the UL-MAP including the allocated uplink resource.

7. The device of claim 6, wherein the ranging request includes a ranging purpose indicator indicating that the device is initiating the location update.

8. The device of claim 6, wherein the processor is configured to instruct the radio frequency unit to transmit an assigned ranging code to the base station when the network access type indicates a dedicated ranging channel allocation, wherein the paging message further includes information on the assigned ranging code.

9. The device of claim 6, wherein the paging message further includes an identifier that identifies the device.

10. The device of claim 9, wherein the identifier includes a Medium Access Control (MAC) address of the device.

* * * * *